(12) United States Patent
Higashitani et al.

(10) Patent No.: US 11,708,081 B2
(45) Date of Patent: Jul. 25, 2023

(54) CONTROL DEVICE

(71) Applicant: DENSO CORPORATION, Kariya (JP)

(72) Inventors: Mitsuharu Higashitani, Kariya (JP);
Noriaki Ikemoto, Kariya (JP); Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/505,009

(22) Filed: Oct. 19, 2021

(65) Prior Publication Data
US 2022/0032931 A1 Feb. 3, 2022

Related U.S. Application Data

(63) Continuation of application No. 16/422,066, filed on May 24, 2019, now Pat. No. 11,203,351, which is a (Continued)

(30) Foreign Application Priority Data

Dec. 14, 2016 (JP) .................... 2016-242028

(51) Int. Cl.
*B60W 50/04* (2006.01)
*B60L 7/10* (2006.01)
(Continued)

(52) U.S. Cl.
CPC ............... *B60W 50/04* (2013.01); *B60L 7/10* (2013.01); *B60R 16/02* (2013.01); *B60W 30/18* (2013.01);
(Continued)

(58) Field of Classification Search
CPC .......... B60L 7/10; B60R 16/02; B60W 50/04; B60W 30/18; B60W 30/18018;
(Continued)

(56) References Cited

U.S. PATENT DOCUMENTS

| 8,204,660 | B2 | 6/2012 | Nakai et al. |
| 10,525,370 | B1 | 1/2020 | Poteet et al. |
| 2005/0080523 | A1* | 4/2005 | Bennett ................. B60K 6/445 180/65.23 |
| 2007/0069734 | A1* | 3/2007 | Bertness ............ G01R 31/3648 324/411 |

(Continued)

FOREIGN PATENT DOCUMENTS

| EP | 2192332 A1 | 6/2010 |
| JP | 2006-220157 A | 8/2006 |

(Continued)

OTHER PUBLICATIONS

Mar. 23, 2021 U.S. Office Action issued U.S. Appl. No. 16/422,066.
(Continued)

*Primary Examiner* — Tyler J Lee
*Assistant Examiner* — Yufeng Zhang
(74) *Attorney, Agent, or Firm* — Oliff PLC

(57) ABSTRACT

A control device of an automatic drive vehicle includes: an information acquisition unit that acquires power generator information as information on a power generator provided in the automatic drive vehicle; an operation control unit that switches between a first state in which automatic driving of the automatic drive vehicle is executed without restriction and a second state in which the automatic driving is partially or entirely restricted; and a determination unit that determines whether to perform switching to the second state by the operation control unit.

16 Claims, 8 Drawing Sheets

Related U.S. Application Data continuation of application No. PCT/JP2017/039321, filed on Oct. 31, 2017.

(51) Int. Cl.
  *B60R 16/02* (2006.01)
  *B60W 30/18* (2012.01)
  *H02P 9/04* (2006.01)
  *H02P 9/08* (2006.01)

(52) U.S. Cl.
  CPC ............ *B60W 30/18018* (2013.01); *B60W 30/18109* (2013.01); *H02P 9/04* (2013.01); *H02P 9/08* (2013.01)

(58) Field of Classification Search
  CPC ..... B60W 30/18109; B60W 2510/242; B60W 2050/007; B60W 2510/244; B60W 2710/18; B60W 2710/20; H02P 9/04; H02P 9/08; H02P 29/025
  See application file for complete search history.

(56) References Cited

U.S. PATENT DOCUMENTS

| | | |
|---|---|---|
| 2008/0319596 A1 | 12/2008 | Yamada |
| 2008/0319597 A1 | 12/2008 | Yamada |
| 2015/0127203 A1 | 5/2015 | Kashiba |
| 2016/0006378 A1* | 1/2016 | Allan ................ B60L 3/106 318/13 |
| 2016/0303996 A1 | 10/2016 | Sponheimer et al. |
| 2017/0240046 A1* | 8/2017 | Vik ..................... E02F 9/02 |
| 2018/0154777 A1* | 6/2018 | Hall .................... B60L 7/18 |

FOREIGN PATENT DOCUMENTS

| | | |
|---|---|---|
| JP | 2010-151307 A | 7/2010 |
| WO | 2014/025069 A1 | 2/2014 |

OTHER PUBLICATIONS

Jul. 15, 2021 Notice of Allowance Issued In U.S. Appl. No. 16/422,066.

* cited by examiner

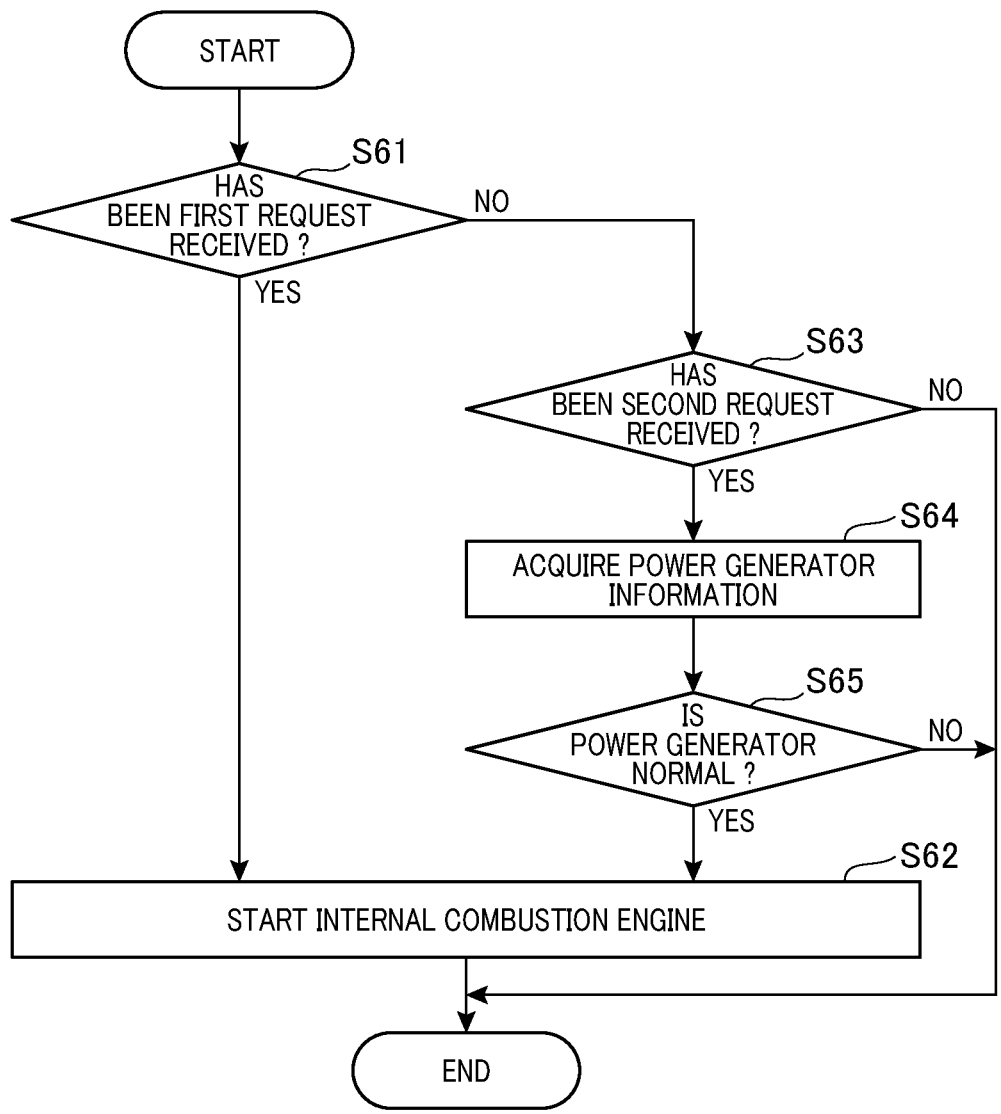

CONTROL DEVICE

CROSS-REFERENCE TO RELATED APPLICATION

This application is a Continuation Application of U.S. patent application Ser. No. 16/422,066 filed May 24, 2019, which is a Bypass Application of International Application No. PCT/JP2017/039321 filed Oct. 31, 2017 which designated the U.S. and claims priority to Japanese Patent Application No. 2016-242028 filed on Dec. 14, 2016, the contents of which are incorporated herein by reference.

TECHNICAL FIELD

The present disclosure relates to a control device of an automatic drive vehicle.

BACKGROUND

Automatic drive vehicles have been developed. Automatic drive vehicles can automatically perform some or all of driving operations that had been performed by a driver of the vehicle or can assist the driver in performing the driving operations. Some of these automatic drive vehicles automatically perform all the operations such as steering during running of the vehicle, others automatically perform only temporary driving operations at the time of a lane change, for example.

SUMMARY

A control device according to the present disclosure is a control device of an automatic drive vehicle. The control device includes: an information acquisition unit that acquires power generator information as information on a power generator provided in the automatic drive vehicle; an operation control unit that switches between a first state in which automatic driving of the automatic drive vehicle is executed without restriction and a second state in which the automatic driving is partially or entirely restricted; and a determination unit that determines based on the power generator information whether to perform switching to the second state by the operation control unit.

BRIEF DESCRIPTION OF THE DRAWINGS

In the accompanying drawings:

FIG. 8 is a flowchart of a process performed by a control device according to a third embodiment.

DETAILED DESCRIPTION OF THE PREFERRED EMBODIMENTS

Figure 1:
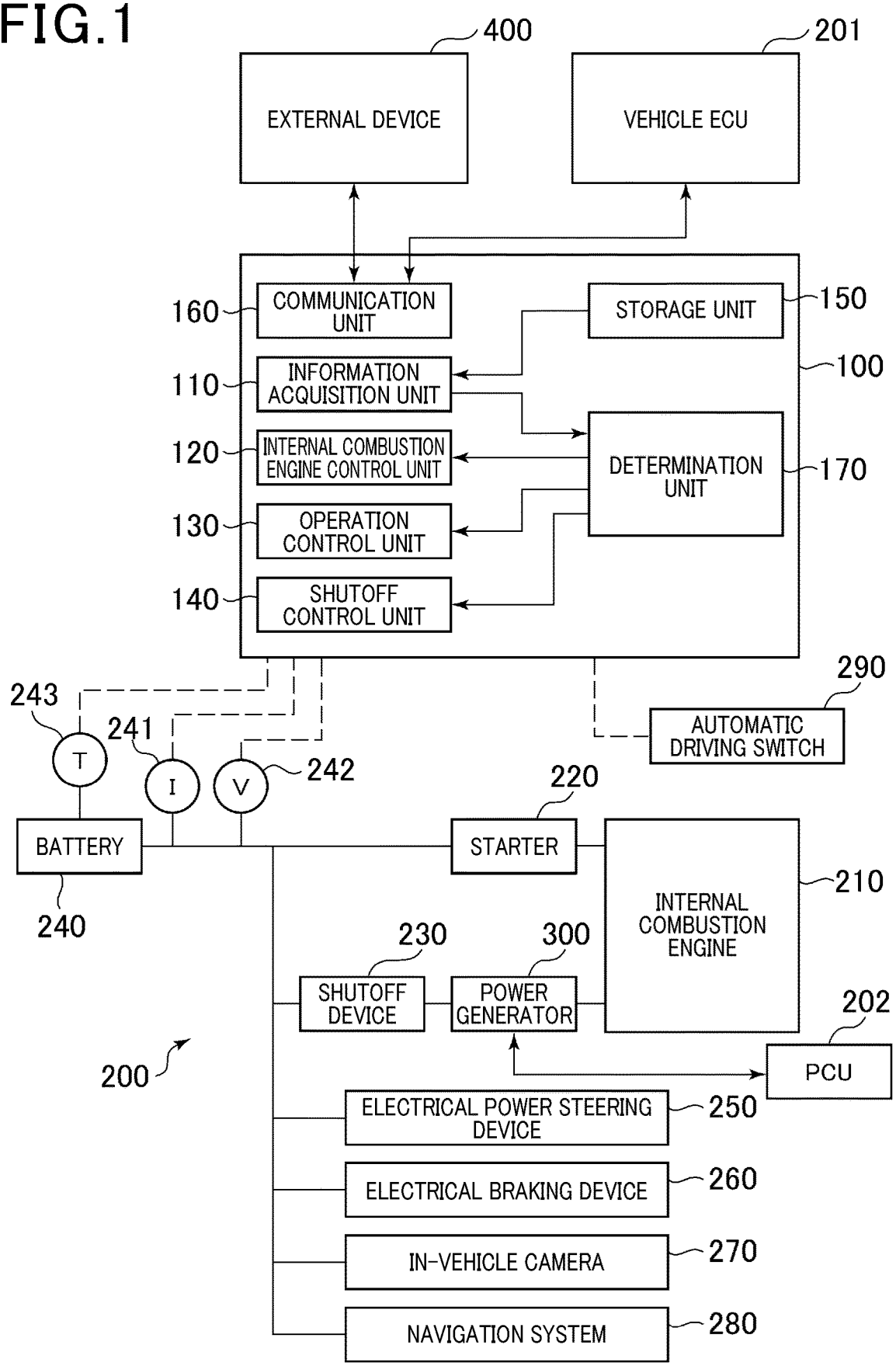
FIG. 1 is a diagram schematically illustrating a configuration of a control device according to a first embodiment.

Like conventional vehicles with no automatic driving function, an automatic drive vehicle is equipped with a storage battery for storing power and supplying the same to auxiliary devices. The automatic drive vehicle is also equipped with a power generator for supplying power to the storage battery. The power generator is intended to generate power by driving force of the internal combustion engine and supply the generated power to the storage battery and the auxiliary devices.

In the event of an abnormality in the power generator, no power is supplied from the power generator to the storage battery, and thus the power stored in the storage battery gradually decreases. Accordingly, with a lapse of time, enough power is not supplied from the storage battery to the auxiliary devices, so that the auxiliary devices may not be able to perform normal operation.

In particular, an automatic drive vehicle includes a large number of auxiliary devices that consume power such as an electrical braking device, for example. Therefore, in the event of a lack of power due to an abnormality in the power generator, the automatic drive vehicle cannot start normally or continue automatic driving, and thus the operations of the automatic drive vehicle may become unstable. For example, an in-vehicle camera may become unable to operate normally due to a lack of power and may not correctly recognize obstacles around the vehicle.

An embodiment provides a control device of an automatic drive vehicle that prevents the automatic drive vehicle from becoming unstable in operations due to an abnormality in a power generator.

A control device according to the present disclosure is a control device of an automatic drive vehicle. The control device includes: an information acquisition unit that acquires power generator information as information on a power generator provided in the automatic drive vehicle; an operation control unit that switches between a first state in which automatic driving of the automatic drive vehicle is executed without restriction and a second state in which the automatic driving is partially or entirely restricted; and a determination unit that determines based on the power generator information whether to perform switching to the second state by the operation control unit.

In the control device, the determination unit determines based on the power generator information as the information relating to the power generator whether to perform switching to the second state by the operation control unit, that is, whether the automatic driving is partially or entirely restricted. Accordingly, when it is determined that the power generator has failed, for example, automatic driving is partially restricted to continue the automatic driving within the range of consumable power.

According to the present disclosure, it is possible to provide a control device of an automatic drive vehicle that prevents the automatic drive vehicle from becoming unstable in operations due to an abnormality in the power generator.

Hereinafter, embodiments will be described with reference to the attached drawings. For easy understanding of the descriptions, identical components illustrated in the drawings are given identical reference signs as much as possible and redundant descriptions thereof will be omitted.

A control device 100 according to a first embodiment is installed in an automatic drive vehicle 200 (not entirely illustrated) to control the automatic drive vehicle 200. Prior to the description of the control device 100, a configuration of the automatic drive vehicle 200 will be described with reference to FIG. 1.

The automatic drive vehicle 200 in the present embodiment is structured as a vehicle that can automatically run without depending on the driver's operations. The automatic drive vehicle 200 can switch between a state in which the automatic driving as described above is performed and a state in which conventional running is performed based on the driver's operations (that is, no automatic driving is performed). The automatic drive vehicle 200 includes an internal combustion engine 210, a starter 220, a power generator 300, a battery 240, and a vehicle ECU 201.

The internal combustion engine 210 is a vehicle engine. The internal combustion engine 210 burns a supplied fuel therein to generate driving force necessary for running of the automatic drive vehicle 200.

The starter 220 is a rotary electrical machine that operates with a supply of power from the battery 240 described later. The starter 220 rotates a crankshaft (not illustrated) of the internal combustion engine 210 to perform cranking, thereby starting the internal combustion engine 210. The starter 220 is equivalent to one of auxiliary devices necessary for running of the automatic drive vehicle 200.

The power generator 300 is a power generator driven by the internal combustion engine 210. When the internal combustion engine 210 is operating, the power generator 300 generates power and supplies the power to the components of the automatic drive vehicle 200. A specific configuration of the power generator 300 will be described later.

As illustrated in FIG. 1, in a path to which the power is output from the power generator 300, a shutoff device 230 is provided to switch opening and closing of the path. The shutoff device 230 is formed as a relay and its opening and closing operations are controlled by the control device 100. When the shutoff device 230 is in the closed state, the power generated by the power generator 300 is supplied to the auxiliary devices such as the battery 240 and an electrical power steering device 250. When the shutoff device 230 is in the open state, the power generated by the power generator 300 is not supplied to the battery 240 or any of the auxiliary devices.

The battery 240 is a storage battery to supply power to the starter 220 and other devices. The power output (discharged) from the battery 240 is supplied together with the power output from the power generator 300 to the components of the automatic drive vehicle 200. In particular, when the internal combustion engine 210 is started by the starter 220, the power generator 300 is stopped and thus the starter 220 is supplied with power from the battery 240 alone. As described above, the battery 240 is provided as a device for supplying the starter 220 with the power necessary for starting of the internal combustion engine 210. The battery 240 also supplies the power necessary for operations of the control device 100.

The battery 240 can store the power generated by the power generator 300 (that is, charging). The input and output of power to and from the battery 240 are performed via a power convertor not illustrated. The power convertor is operated via the control device 100. Instead of such a mode, a separate ECU may be provided to control the battery 240 and the power convertor. In this case, the control device 100 controls charging and discharging of the battery 240 through communications with the ECU.

The vehicle ECU 201 is a higher-level control device that is provided to control the overall operations of the automatic drive vehicle 200. The processes performed by the vehicle ECU 201 include a process of determining whether to shift the automatic drive vehicle 200 to a state in which the operation of the internal combustion engine 210 is stopped, that is, an idle stop state. In addition, the processes performed by the vehicle ECU 201 include a process of determining whether to automatically return the automatic drive vehicle 200 from the idle stop state (that is, whether to restart the internal combustion engine 210). Some of the processes performed by the control device 100 are performed based on control signals transmitted from the vehicle ECU 201.

The automatic drive vehicle 200 is equipped with a plurality of power-consuming devices that operates with a supply of power from the battery 240 or the power generator 300. Among the plurality of power-consuming devices, FIG. 1 illustrates the electrical power steering device 250, an electric braking device 260, an in-vehicle camera 270, and a navigation system 280.

The electrical power steering device 250 is a device that applies steering force resulting from electric power to a steering shaft. When the automatic drive vehicle 200 is performing automatic driving, the electrical power steering device 250 generates all the steering force necessary for running along the lane without depending on the driver's steering operations. When the automatic drive vehicle 200 is not performing automatic driving, the electrical power steering device 250 applies auxiliary steering force to the steering shaft to reduce the driver's force to be applied to the steering wheel. The electrical power steering device 250 is equivalent to one of the auxiliary devices necessary for running the automatic drive vehicle 200.

Operations of the electrical power steering device 250 are controlled by the control device 100 described later. In another mode, a separate ECU may be provided to control the electrical power steering device 250. In this case, the control device 100 controls the operations of the electrical power steering device 250 through communications with the ECU.

The electric braking device 260 is a device that generates braking force resulting from power to decelerate or stop the automatic drive vehicle 200. The electric braking device 260 is equivalent to one of the auxiliary devices necessary for running the automatic drive vehicle 200.

When the automatic drive vehicle 200 is performing automatic driving, the electric braking device 260 automatically generates braking force without depending on the driver's braking operations. The operations of the electric braking device 260 are controlled by the control device 100. In another mode, a separate ECU may be provided to control the electric braking device 260. In this case, the control device 100 controls the operations of the electric braking device 260 through communications with the ECU.

The in-vehicle camera 270 is a camera that captures images of the surroundings of the automatic drive vehicle 200, in particular, images of the area in front of the automatic drive vehicle 200. The in-vehicle camera 270 has a CMOS sensor, for example. The in-vehicle camera 270 transmits data of the captured images to the control device 100. The control device 100 analyzes the images to detect the positions of obstacles around the automatic drive vehicle 200 and the lane on the automatic drive vehicle 200 is running. This makes it possible to automatically perform steering and braking for avoiding a collision with an obstacle and steering for running along the lane. The image processing as described above may be performed by an ECU provided separately from the control device 100.

In addition to the in-vehicle camera 270, a radar device and a laser device may be provided to detect obstacles.

The navigation system 280 is a system that identifies the current running location of the automatic drive vehicle 200 by GPS. The navigation system 280 can generate a route on which the automatic drive vehicle 200 is to run to arrive at the destination, display the route to the passenger, and guide the automatic drive vehicle 200 to run along the route.

Other components of the automatic drive vehicle 200 will be described. An automatic driving switch 290 is provided at the driver's seat of the automatic drive vehicle 200. The automatic driving switch 290 is a switch to be operated by the driver to switch between on and off states of automatic driving. When the automatic driving switch 290 is turned on, the automatic drive vehicle 200 performs automatic driving. When the automatic driving switch 290 is turned off, the automatic drive vehicle 200 does not perform automatic driving. That is, the automatic drive vehicle 200 runs based on the driver's manual driving operations.

The automatic drive vehicle 200 is provided with a large number of sensors to measure the physical amounts of the components. Among the plurality of sensors, FIG. 1 illustrates a current sensor 241, a voltage sensor 242, and a temperature sensor 243.

The current sensor 241 is a sensor to measure the value of a current input and output to and from the battery 240. The current measured by the current sensor 241 is transmitted as an electrical signal to the control device 100.

The voltage sensor 242 is a sensor to measure an inter-terminal voltage of the battery 240. The inter-terminal voltage measured by the voltage sensor 242 is transmitted as an electrical signal to the control device 100.

The temperature sensor 243 is a sensor to measure the temperature of the battery 240. The temperature of the battery 240 measured by the temperature sensor 243 is transmitted as an electrical signal to the control device 100.

Instead of the mode as described above, the measurement values of the current sensor 241 and others may be transmitted to the control device 100 via another ECU to control the battery 240 and the power convertor.

A configuration of the power generator 300 will be described with reference to FIG. 2. The power generator 300 is formed as an alternator that has a stator 310, a rotor 320, and a regulator 360.

The stator 310 is a member that is fixed in the housing of the power generator 300. The stator 310 is provided with a stator coil 311. The rotor 320 is a member that is rotatably held in the housing. The rotor 320 is provided with a rotor coil 321.

A portion of the rotor 320 on one side (the left side in FIG. 2) along its rotation axis constitutes a columnar shaft 330 that protrudes outward. The shaft 330 is rotatably held by a bearing not illustrated. A tip of the shaft 330 is provided with a pulley 340. When the internal combustion engine 210 is driven, the driving force of the internal combustion engine 210 is transmitted to the pulley 340 via a belt not illustrated. Accordingly, the rotor 320 rotates around its central axis.

A portion of the rotor 320 on the other side (the right side in FIG. 2) along its rotation axis constitutes a columnar shaft 350 and protrudes outward. The shaft 350 is rotatably held by a bearing not illustrated. The shaft 350 is provided with a pair of slip rings 351 and 352 that accepts power to be supplied to the rotor coil 321. The slip ring 351 is conductive to one of lead lines that leads to the rotor coil 321, and the slip ring 352 is conductive to the other of the lead lines that leads to the rotor coil 321.

The regulator 360 adjusts the magnitude of a current to flow to the rotor coil 321, thereby adjusting the magnitude of power to be generated by the power generator 300. The regulator 360 is supplied with power from the battery 240 via a lead line 380. After adjusting the magnitude of the power, the regulator 360 outputs the power to lead lines 370. The pair of lead lines 370 has brushes 361 and 362 at their tips. The brush 361 is in contact with the surface of the slip ring 351, and the brush 362 is in contact with the surface of the slip ring 352. Accordingly, even when the shaft 350 rotates together with the rotor 320, the regulator 360 can supply power to the rotor coil 321.

The regulator 360 has a current sensor 363 and a voltage sensor 364 therein. The current sensor 363 is a sensor that measures the value of a current output from the regulator 360 to the lead lines 370, that is, the value of a current supplied to the rotor coil 321. The value of the current measured by the current sensor 363 is transmitted as an electrical signal to the control device 100. The voltage sensor 364 is a sensor that measures the value of a voltage output from the regulator 360 to the lead lines 370, that is, the value of a voltage applied to the rotor coil 321. The value of the voltage measured by the voltage sensor 364 is transmitted as an electrical signal to the control device 100.

When the power from the regulator 360 is supplied to the rotor coil 321, the rotor coil 321 is excited. When the rotor 320 rotates in this state, an inductive current is generated in the stator coil 311. The inductive current is taken out to the outside via lead lines 390 and is supplied to the battery 240 and others as described above.

The magnitude of the current supplied from the regulator 360 to the rotor coil 321 is adjusted by a power control unit (PCU) 202 provided in the automatic drive vehicle 200. The PCU 202 controls the operations of the regulator 360 by transmitting control signals to the regulator 360, thereby to adjust the current to be supplied from the regulator 360 to the rotor coil 321. The PCU 202 monitors the magnitude of a system voltage in the automatic drive vehicle 200 and adjusts the current to be supplied to the rotor coil 321 based on the monitored magnitude, thereby to control the amount of power generated by the power generator 300. In another aspect, the control device 100 may play the role of the PCU 202 as described above.

The lead line 380 is provided with a current sensor 381 and a voltage sensor 382. The current sensor 381 is a sensor that measures the value of a current supplied from the battery 240 to the regulator 360. The value of the current measured by the current sensor 381 is transmitted as an electrical signal to the control device 100. The voltage sensor 382 is a sensor that measures the value of a voltage applied from the battery 240 to the regulator 360. The value of the voltage measured by the voltage sensor 382 is transmitted as an electrical signal to the control device 100.

The lead lines 390 are provided with a current sensor 391 and a voltage sensor 392. The current sensor 391 is a sensor that measures the value of a current output from the power generator 300 to the outside, that is, the value of a current generated in the stator coil 311. The value of the current measured by the current sensor 391 is transmitted as an electrical signal to the control device 100 and the regulator 360. The voltage sensor 392 is a sensor that measures the value of a voltage output from the power generator 300 to the outside, that is, the value of a voltage generated in the stator coil 311. The value of the voltage measured by the voltage sensor 392 is transmitted as an electrical signal to the control device 100 and the regulator 360.

The regulator 360 adjusts the magnitude of the current to be supplied to the rotor coil 321 such that the value of the voltage measured by the voltage sensor 392 meets a predetermined target value. Accordingly, even when the number of rotations of the rotor 320 varies, the magnitude of the voltage output from the power generator 300 can be kept constant.

A configuration of the control device 100 will be described with reference again to FIG. 1. The control device 100 is configured as a computer system having a CPU, a ROM, and a RAM. The control device 100 includes, as functional control blocks, an information acquisition unit 110, an internal combustion engine control unit 120, an operation control unit 130, a shutoff control unit 140, a storage unit 150, a communication unit 160, and a determination unit 170.

The thus configured control device 100 may be a single computer system or a plurality of computer systems that operate in conjunction with one another to function as the control device 100 on the whole. Part of all of the control device 100 may be installed separately from the automatic drive vehicle 200 to control the automatic drive vehicle 200 through communications with the automatic drive vehicle 200.

The information acquisition unit 110 acquires power generator information as information relating to the power generator 300. The power generator information includes the length of a period of time from the installation of the power generator 300 in the automatic drive vehicle 200 to the present time, that is, the duration of use of the power generator 300. The power generator information also includes current values and voltage values measured by the current sensor 381, the voltage sensor 382, the current sensor 363, the voltage sensor 364, the current sensor 391, and the voltage sensor 392.

The power generator information further includes the temperature of the battery 240 measured by the temperature sensor 243. The reason why the temperature of the battery 240 is used as part of the power generator information is that, with an increase in the amount of power generated by the power generator 300, the value of the current supplied to the battery 240 becomes larger and the temperature of the battery 240 increases accordingly.

The internal combustion engine control unit 120 controls the operations of the internal combustion engine 210 to shift to the idle stop state in which the internal combustion engine 210 is stopped and to return from the idle stop state (that is, the restarting of the internal combustion engine 210). The internal combustion engine control unit 120 can stop supply of a fuel to the internal combustion engine 210 to stop the internal combustion engine 210 and shift to the idle stop state. The internal combustion engine control unit 120 can also operate the starter 220 to start the internal combustion engine 210 and return from the idle stop state. The internal combustion engine control unit 120 obtains the present operating state of the internal combustion engine 210 by detecting the number of rotations of the crankshaft by a sensor (not illustrated), for example.

The processes by the internal combustion engine control unit 120 described above are performed by the internal combustion engine control unit 120 controlling directly the operations of the starter 220 and others. In another mode, the foregoing processes may be performed by another ECU to control the starter 220 and the internal combustion engine 210 communicating with the internal combustion engine control unit 120.

The internal combustion engine control unit 120 brings the internal combustion engine 210 into a temporarily stopped state (idle stop state) while the automatic drive vehicle 200 is waiting for a traffic light, for example. In addition, the internal combustion engine control unit 120 brings the internal combustion engine 210 into a temporarily stopped state while the automatic drive vehicle 200 is freewheeling such as running on a flat road, for example. This suppresses wasteful consumption of a fuel and emission of an exhaust gas.

The internal combustion engine control unit 120 restarts the internal combustion engine 210 when the driving force of the internal combustion engine 210 becomes necessary for running or when the power generation by the power generator 300 becomes necessary for air-conditioning. The switching of operating state of the internal combustion engine 210 as described above is automatically performed by the internal combustion engine control unit 120 without depending on the driver's operations.

In the present embodiment, the determinations on whether to shift to the idle stop state and whether to return from the idle stop state are made by the vehicle ECU 201, not by the internal combustion engine control unit 120. The vehicle ECU 201 transmits a control signal to the internal combustion engine control unit 120, thereby to cause the internal combustion engine control unit 120 to shift to the idle stop state.

When the driving force for running becomes necessary in the idle stop state, the vehicle ECU 201 transmits a control signal for generating the driving force necessary for running of the automatic drive vehicle 200 (hereinafter, also called "first request") to the internal combustion engine control unit 120. When the power generation by the power generator 300 becomes necessary in the idle stop state, the vehicle ECU 201 transmits a control signal for causing the power generator 300 to start power generation (hereinafter, also called "second request") to the internal combustion engine control unit 120. The internal combustion engine control unit 120 is configured to, upon receipt of at least either of the first request and the second request, start the internal combustion engine 210 to return from the idle stop state.

The operation control unit 130 performs a process of switching between a state in which the automatic drive vehicle 200 executes automatic driving and a state in which the automatic drive vehicle 200 executes no automatic driving. The operation control unit 130 performs the process based on an operation by the driver on the automatic driving switch 290.

The automatic driving in the present embodiment includes a control of automatically steering the automatic drive vehicle 200 (hereinafter, also called "automatic steering"), a control of automatically braking the automatic drive vehicle 200 (hereinafter, also called "automatic braking"), and a control of automatically adjusting driving force of the automatic drive vehicle 200 (hereinafter, also called "automatic driving").

During automatic driving, the automatic drive vehicle 200 can take a first state in which the foregoing three controls are executed without restriction or a second state in which at least one of the foregoing three controls is restricted. The second state includes a state in which only one or two of automatic steering, automatic driving, and automatic driving are executed and the other(s) is not executed (that is, automatic driving is partially restricted). The second state also includes a state in which none of automatic steering, automatic driving, and automatic driving is executed (that is, the automatic driving is entirely restricted).

The "restricted" state described above includes a state in which no automatic driving and others are executed and a state in which automatic driving and others are executed under constraints. The "executed state under constraints" refers to, for example, a state in which automatic driving is executed only within a range of running speeds not exceeding 50 km/h.

The operation control unit 130 performs not only the process of switching between the state in which the automatic drive vehicle 200 executes automatic driving and the state in which the automatic drive vehicle 200 executes no automatic driving but also a process of switching between the first state and the second state. The operation control unit 130 switches the state of the automatic drive vehicle 200 but does not determine to which of the states the automatic drive vehicle 200 is to be switched. This determination is made by the determination unit 170 described later.

The shutoff control unit 140 controls the operations of the shutoff device 230. The shutoff control unit 140 controls the operations of the shutoff device 230 based on the determination made by the determination unit 170 (described later) to switch between opening and closing of the path to which power from the power generator 300 is output.

The storage unit 150 is a non-volatile memory that is provided in the control device 100. The type of information stored in the storage unit 150 will be described later.

The communication unit 160 is an interface for the control device 100 to communicate with the outside. The communications between the control device 100 and the vehicle ECU 201 are performed via the communication unit 160.

An external device 400 illustrated in FIG. 1 is connected to the automatic drive vehicle 200 when the automatic drive vehicle 200 is subjected to inspection or maintenance (for example, replacements of the battery 240 and the power generator 300). The external device 400 communicates with the automatic drive vehicle 200 via the communication unit 160 to acquire the states of the components of the automatic drive vehicle 200 and display the same on a screen or rewrite part of the information stored in the storage unit 150 of the automatic drive vehicle 200. The external device 400 is not connected to the automatic drive vehicle 200 in the running state but is illustrated in FIG. 1 for the convenience of description.

The determination unit 170 decides whether to start (or continue) automatic driving or determines in which of the first and second states to execute automatic driving. In particular, the determination unit 170 is configured to determine whether to perform switching to the second state by the operation control unit 130 based on the power generator information acquired by the information acquisition unit 110. The operation control unit 130 switches the state of the automatic drive vehicle 200 according to the determination made by the determination unit 170. The determination made by the determination unit 170 will be specifically described later.

Figure 3:
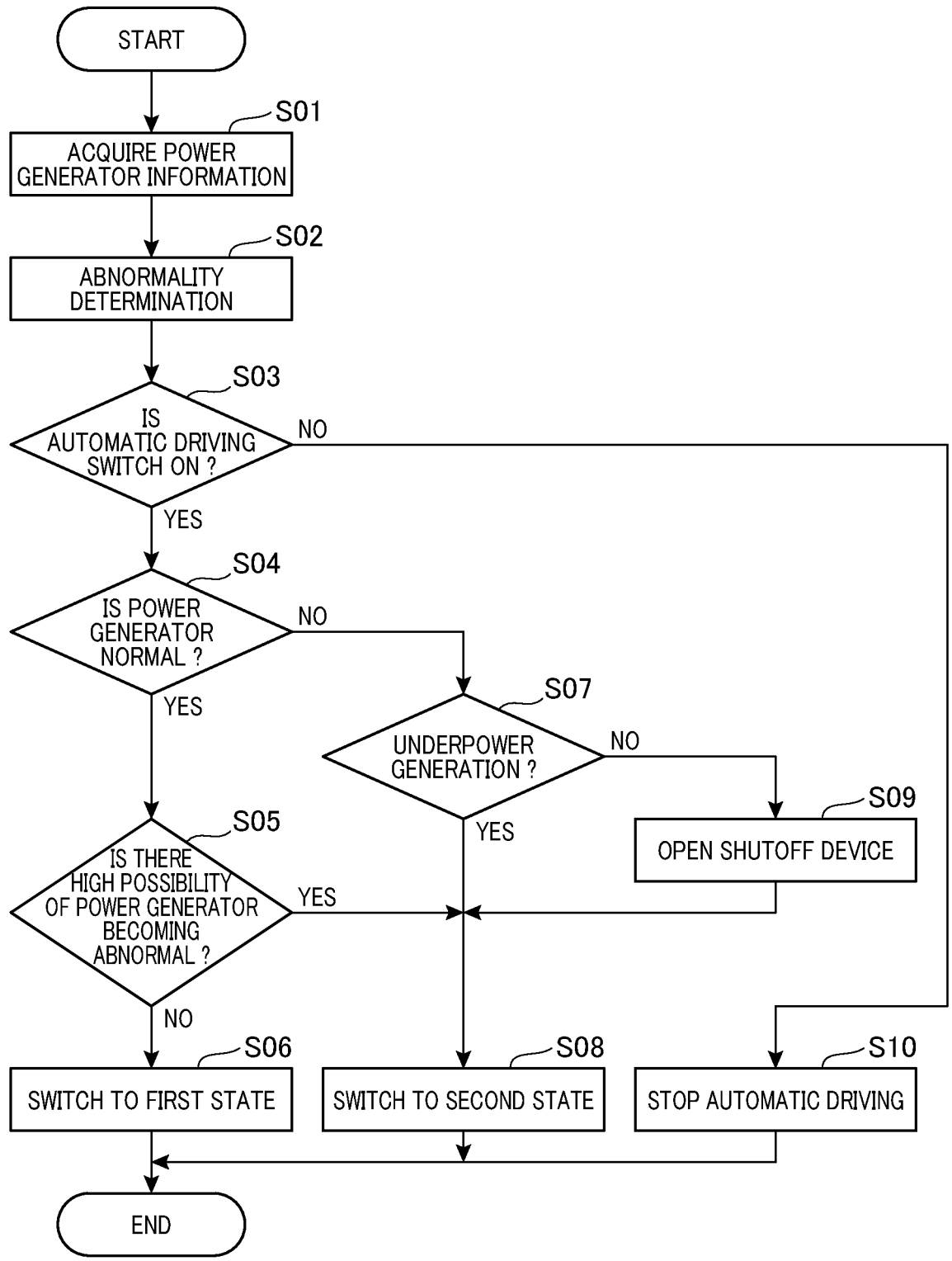
FIG. 3 is a flowchart of a process performed by the control device illustrated in FIG. 1.

A specific flow of a process executed by the control device 100 will be described with reference to FIG. 3. The series of steps illustrated in FIG. 3 are repeatedly executed by the control device 100. This process is performed both in the state in which the automatic drive vehicle 200 executes automatic driving and the state in which the automatic drive vehicle 200 executes no automatic driving.

In the first step S01, the information acquisition unit 110 acquires the power generator information. As the power generator information, the information acquisition unit 110 acquires the current values and the voltage values measured by the current sensor 381, the voltage sensor 382, the current sensor 363, the voltage sensor 364, the current sensor 391, the voltage sensor 392.

The storage unit 150 stores the date and time when the power generator 300 was installed in the automatic drive vehicle 200. The information acquisition unit 110 calculates the duration of use of the power generator 300 based on the date and time. In step S01, the information acquisition unit 110 also acquires the calculated duration of use of the power generator 300 as the power generator information. The date and time is written to the storage unit 150 by the external device 400 connected at the time of replacement of the power generator 300.

After step S01, it is determined in step S02 whether an abnormality has occurred in the power generator 300. The determination is made by the determination unit 170. The abnormality determined here includes a state in which power generation is not sufficiently performed by the power generator 300 (hereinafter, also called "underpower generation state"). The abnormality in the power generator 300 also includes a state in which power generation by the power generator 300 is excessive (hereinafter, also called "overpower generation state").

A method for determining whether the power generator 300 is in the underpower generation state will be described. In step S02, when the current value measured by the current sensor 391 (that is, the current value in the stator coil 311) is equal to or less than a predetermined value, it is determined that the power generator 300 is in the underpower generation state. In addition, when the voltage value measured by the voltage sensor 392 (that is, the voltage value in the stator coil 311) is equal to or less than a predetermined value, it is also determined that the power generator 300 is in the underpower generation state.

In step S02, when the current value measured by the current sensor 363 (that is, the current value in the rotor coil 321) is equal to or less than a predetermined value, it is determined that the power generator 300 is in the underpower generation state resulting from abrasion of the brushes 361 and 362. In addition, when the voltage value measured by the voltage sensor 364 (that is, the voltage value in the rotor coil 321) is equal to or greater than a predetermined value, it is determined that the power generator 300 is in the underpower generation state resulting from abrasion of the brushes 361 and 362.

Further, in step S02, when the current value measured by the current sensor 381 is equal to or less than a predetermined value, it is determined that the power generator 300 is in the underpower generation state resulting from a connection failure of the terminal portion. When the voltage value measured by the voltage sensor 382 is equal to or greater than a predetermined value, it is determined that the power generator 300 is in the underpower generation state resulting from a connection failure of the terminal portion.

The determinations based on the current values and the voltage values described above may be made based on their respective absolute values or based on the amounts of changes in the measured values when changing the internal combustion engine 210 from the stopped state to the operating state. For example, when a value obtained by subtracting the voltage value measured by the voltage sensor 392 while the internal combustion engine 210 is stopped from the voltage value measured by the voltage sensor 392 while the internal combustion engine 210 is operating is smaller than a predetermined value, it may be determined that the power generator 300 is in the power generation state.

The foregoing determinations on whether the power generator 300 is in the underpower generation state may be performed on all the plurality of items listed above or based on only some of the items.

Among the foregoing determinations, the determination based on the current value, the determination based on the regulator voltage (the voltage value measured by the voltage sensor 382), and the determination based on the rotor voltage (the voltage value measured by the voltage sensor 364) may be performed only at a timing when a system voltage has become lower than a predetermined value or at a timing when the PCU 202 has issued a power generation instruction. This is because, when the system voltage is high to some degree, the current to be supplied to the rotor coil 321 may be reduced to suppress the amount of power generation even if no abnormality has occurred. The system voltage refers to an inter-terminal voltage of the battery 240, for example.

Among the determinations listed above, the determination based on the stator voltage value (the voltage value measured by the voltage sensor 392) may be made only at a timing when the PCU 202 has issued a power generation instruction.

A method for determining whether the power generator 300 is in the overpower generation state will be described. In step S02, when the current value measured by the current sensor 391 (that is, the current value in the stator coil 311) is equal to or greater than a predetermined value, it is determined that the power generator 300 is in the overpower generation state. In addition, when the voltage value measured by the voltage sensor 392 (that is, the voltage value in the stator coil 311) is equal to or greater than a predetermined value, it is determined that the power generator 300 is in the overpower generation state.

In step S02, when the current value measured by the current sensor 363 (that is, the current value in the rotor coil 321) is equal to or greater than a predetermined value, it is determined that the power generator 300 is in the overpower generation state resulting from a failure of the regulator 360. In addition, when the voltage value measured by the voltage sensor 364 (that is, the voltage value in the rotor coil 321) is equal to or greater than a predetermined value, it is determined that the power generator 300 is in the overpower generation state resulting from a failure of the regulator 360.

Further, in step S02, when the current value measured by the current sensor 381 is equal to or greater than a predetermined value, it is determined that the power generator 300 is in the overpower generation state resulting from a failure of the regulator 360. In addition, when the voltage value measured by the voltage sensor 382 is equal to or less than a predetermined value, it is determined that the power generator 300 is in the overpower generation state resulting from a failure of the regulator 360.

In step S02, when the temperature of the battery 240 measured by the temperature sensor 243 exceeds a predetermined value, it is determined that the power generator 300 is in the overpower generation state. This is because it is estimated that the power supply to the battery 240 increases when the temperature of the battery 240 rises.

The foregoing determinations on whether the power generator 300 is in the overpower generation state may be performed on all the plurality of items listed above or based on only some of the items.

Figure 2:
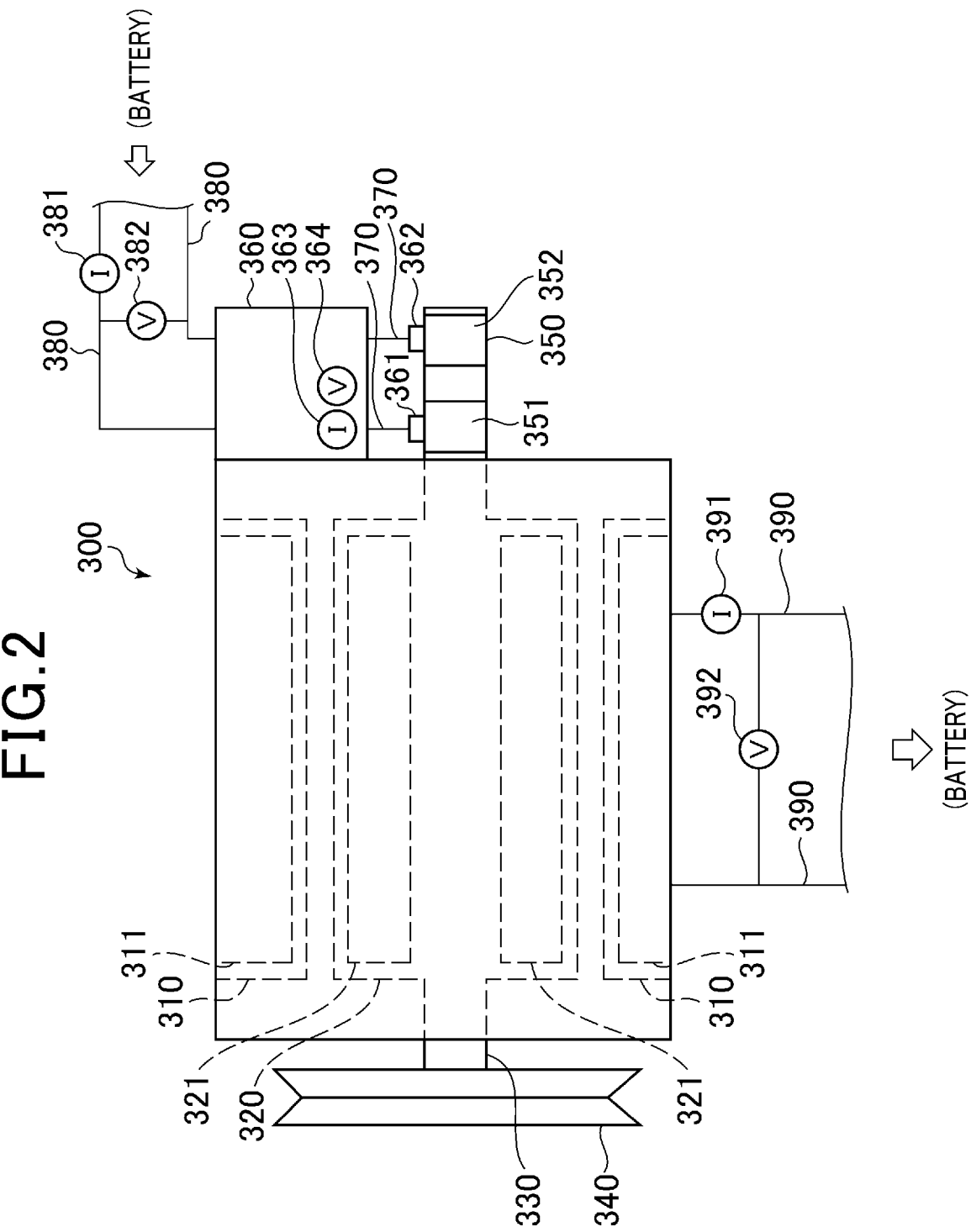
FIG. 2 is a diagram schematically illustrating a configuration of an alternator installed in an automatic drive vehicle.

At the determination on whether the power generator 300 is in the underpower generation state or the overpower generation state, the portions measured by the current sensor 391, the voltage sensor 392, and others may be different from those illustrated in FIG. 2. For example, instead of the voltage value measured by the voltage sensor 392, the voltage value measured by the voltage sensor 242 can be used. This is because these measured voltages can be regarded as identical depending on the connection state of the shutoff device 230 and other relays (not illustrated).

While the internal combustion engine 210 is operating, the timing for making the foregoing determination based on the current sensor 391 or the voltage sensor 392 may be limited to the timing when the number of rotations of the internal combustion engine 210 is equal to or greater than a predetermined number of rotations. That is, when the power generator 300 is normal, the determination may be made only at a timing when the measurement value from the voltage sensor 392 or the like becomes large to some degree within a predetermined range.

Among the determinations listed above, the determination based on the current value, the determination based on the regulator voltage (the voltage value measured by the voltage sensor 382), and the determination based on the rotor voltage (the voltage value measured by the voltage sensor 364) may be made only at a timing when the system voltage becomes higher than a predetermined value or a timing when the PCU 202 issues no power generation instruction. This is because, when the system voltage is low to some degree, the current supplied to the rotor coil 321 may be intentionally increased even if no abnormality has occurred.

Among the determinations listed above, the determination based on the stator voltage value (the voltage value measured by the voltage sensor 392) may be made only at a timing when the PCU 202 issues no power generation instruction.

In step S02, in addition to the determination on whether any abnormality has occurred in the power generator 300 as described above, it is determined whether there is a high risk of an abnormality occurring in the power generator 300 (specifically, the underpower generation state) in a short time. The determination is made based on, out of the power generator information acquired by the information acquisition unit 110, the duration of use of the power generator 300. When the duration of the use is longer than a predetermined value, it is determined that there is a high possibility of the power generator 300 entering the underpower generation state.

The duration of use of the power generator 300 may be determined based on the time elapsed from the installation of the power generator 300 into the automatic drive vehicle 200 or may be determined based on various indexes substantially proportional to the duration of use of the power generator 300, such as the number of times the internal combustion engine 210 was started after the installation of the power generator 300, the integrated value of the numbers of rotations of the internal combustion engine 210, the running distance of the automatic drive vehicle 200, and the integrated value of the amounts of power generation by the power generator 300.

The result of the determination in step S02 is stored in the storage unit 150 of the control device 100. After step S02, it is determined in step S03 whether the automatic driving switch 290 is in the ON position. When the automatic driving switch 290 is in the ON position, the process proceeds to step S04.

In step S04, the result of the determination in step S02 is read from the storage unit 150. After that, it is determined whether the result of the determination in step S02 indicates that the power generator 300 is operating normally (that is, the power generator 300 is not in the underpower generation state or the overpower generation state). When it is determined that the power generator 300 is normal, the process proceeds to step S05.

In step S05, it is determined whether the result of the determination in step S02 indicates that (the power generator 300 is normal but) there is a high possibility of the power generator 300 entering the underpower generation state. When it is not determined that there is a high possibility of the power generator 300 entering the underpower generation state, the process proceeds to step S06. In step S06, the determination unit 170 decides to switch to the first state. According to the determination, the operation control unit 130 performs switching to the first state. Specifically, the operation control unit 130 switches to the state in which the automatic drive vehicle 200 executes automatic driving without constraints. When the automatic drive vehicle 200 has executed no automatic driving so far, the automatic drive vehicle 200 starts automatic driving from this point in time. When the power generator 300 has been already in the first state at the time of shift to step S06, this state is maintained.

The processing in step S02 may be performed at a timing after step S03 and immediately before step S04.

When it is determined in step S05 that there is a high possibility of the power generator 300 entering the underpower generation state, the process proceeds to step S08. In step S08, the determination unit 170 decides to switch to the second state. According to the determination, the operation control unit 130 performs switching to the second state. Specifically, the operation control unit 130 performs switching to the state in which automatic driving of the automatic drive vehicle 200 is partially or entirely restricted. When the power generator 300 has been already in the second state at the time of shifting to step S08, this state is maintained.

When it is not determined in step S04 that the power generator 300 is normal, the process proceeds to step S07. In step S07, it is determined whether the result of the determination in step S02 indicates the underpower generation state. When it is determined that the power generator 300 is in the underpower generation state, the process proceeds to step S08. In step S08, the determination unit 170 decides to switch to the second state as described above, and then the switching to the second state takes place.

When it is not determined in step S07 that the power generator 300 is in the underpower generation state, the process proceeds to step S09. Shifting to step S09 means that some abnormality has occurred in the power generator 300 and the abnormality is not underpower generation. In this case, it is presumed that the power generator 300 is in the overpower generation state. Accordingly, in step S09, as a measure against overpower generation, the shutoff control unit 140 performs a control to switch the shutoff device 230 to the open state. Accordingly, the path to which power from the power generator 300 is output is opened, thereby to prevent application of a high voltage from the power generator 300 to the battery 240 and the auxiliary devices.

Upon completion of step S09, the process proceeds to step S08. In step S08, the determination unit 170 decides to switch to the second state as described above, and then the switching to the second state takes place.

In step S03, when the automatic driving switch 290 is in the OFF state, the process proceeds to step S10. In step S10, the determination unit 170 decides to stop automatic driving. According to the determination, the operation control unit 130 performs a process of stopping automatic driving. When automatic driving has been already unexecuted at the time of proceeding to step S10, this state is maintained.

As described above, in the control device 100 according to the present embodiment, when the power generator information acquired by the information acquisition unit 110 indicates the underpower generation state in which power generation by the power generator 300 is insufficient (an affirmative determination is made in step S07) or when there is a high possibility of the power generator 300 entering the underpower generation state (an affirmative determination is made in step S05), the determination unit 170 decides to perform switching to the second state by the operation control unit 130. Even when the power generation by the power generator 300 is insufficient, the shifting to the state in which automatic driving is partially or entirely restricted makes it possible to continue automatic driving within the range of consumable power.

In the present embodiment, the power generator 300 is configured as an alternator having the rotor coil 321 and the stator coil 311. The power generator information acquired by the information acquisition unit 110 includes the current value in the rotor coil 321, the voltage value in the rotor coil 321, the current value in the stator coil 311, and the voltage value in the stator coil 311. Based on the power generator information, the determination unit 170 decides whether the power generator 300 is in the underpower generation state (step S02). Comparing the current values and the voltage values in the individual components of the power generator 300 makes it possible to detect an abnormality in the power generator 300 in a precise manner.

The power generator information acquired by the information acquisition unit 110 includes a use history of the power generator 300. Based on the power generator information, the determination unit determines whether there is a high possibility of the power generator 300 entering the underpower generation state (step S05). This enables switching to the second state prior to the occurrence of an abnormality in the power generator 300. Accordingly, it is possible to prevent a situation in which the power generator 300 becomes defective during execution of automatic driving.

When the power generator information acquired by the information acquisition unit 110 indicates the overpower generation state in which that power generation by the power generator 300 is excessive (a negative determination is made in step S07), the determination unit 170 decides to perform switching to the second state by the operation control unit 130. Even when power generation by the power generator 300 is excessive, the shifting to the state in which automatic driving is partially or entirely restricted makes it possible to continue automatic driving within an executable range or prohibit or stop automatic driving.

In the present embodiment, even if no power generator information clearly indicating overpower generation is acquired, when the power generator 300 is not normally operating but is not in the underpower generation state, this situation is handled on the assumption that the power generator 300 is in the overpower generation state. Accordingly, it is possible to prevent a situation in which no overpower generation can be detected but automatic driving is continuously executed.

In another mode, it may be determined to switch to the second state when the power generator information indicating overpower generation is acquired. That is, it may be determined to switch to the second state when it is determined in step S02 that the power generator 300 is in the overpower generation state by the method described above based on at least one of the current value in the rotor coil 321, the voltage value in the rotor coil 321, the current value in the stator coil 311, and the voltage value in the stator coil 311 in the power generator information. In addition, it may be determined that the power generator 300 is in the overpower generation state and it may be determined to switch to the second state when the temperature of the battery 240 (that is, the temperature of the storage battery to which power from the power generator 300 is supplied) included in the power generator information exceeds a predetermined value.

In the event of overpower generation, when the determination unit 170 decides to perform switching to the second state by the operation control unit 130, the shutoff control unit 140 controls the operations of the shutoff device 230 to open the path to which power from the power generator 300 is output. Accordingly, it is possible to prevent a situation in which a high voltage from the power generator 300 is applied to the battery 240 and the auxiliary devices that thus become failed.

Figure 4:
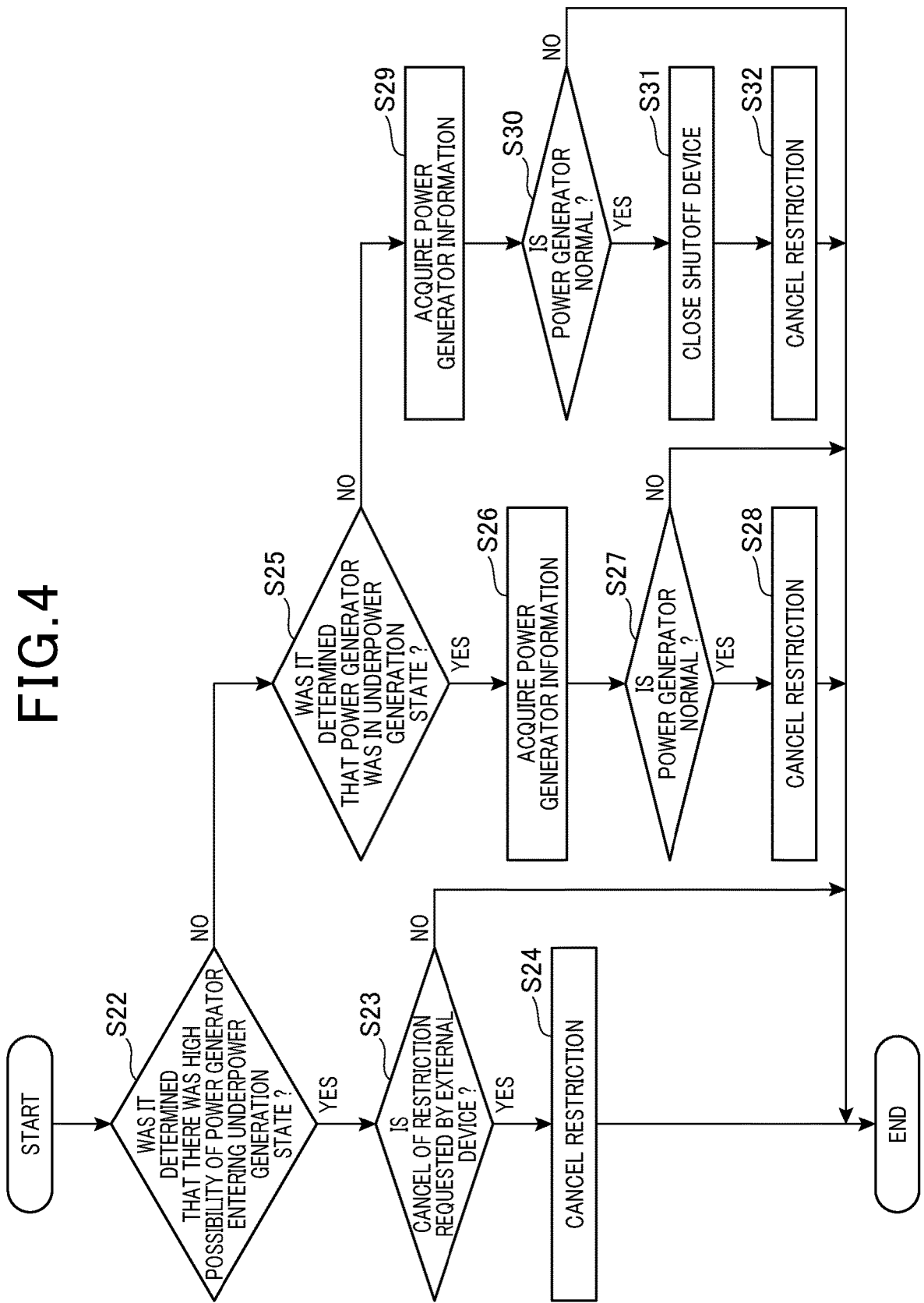
FIG. 4 is a flowchart of a process performed by the control device illustrated in FIG. 1.

After the switching to the second state, when the power generator 300 returns to normal operation due to replacement by a new one, for example, a process of canceling the restriction of automatic driving is performed. This process will be specifically described with reference to FIG. 4. The series of steps illustrated in FIG. 4 are repeatedly executed by the control device 100 after each lapse of a specific period.

In first step S22, it is determined whether it was determined in step S02 illustrated in FIG. 2 that there was a high possibility that the power generator 300 (then normally operating) would enter the underpower generation state. When it was determined that there was a high possibility of the power generator 300 entering in the underpower generation state, the process proceed to step S23.

In step S23, it is determined whether a signal for canceling the restriction of automatic driving has been transmitted from the external device 400 to the communication unit 160. This signal can be said to be a signal indicating that the power generator 300 is normal. When the signal for canceling the restriction of automatic driving has been transmitted, the process proceeds to step S24. In step S24, a process of canceling the restriction of automatic driving is performed.

In this case, for example, the result of the determination stored in the storage unit 150 (the result of the determination made in step S02) is rewritten to store the result that the power generator 300 is normal. In other words, the result of the determination that there is a high possibility of the power generator 300 entering in the underpower generation state is erased. In addition, the various kinds of information indicating the indexes substantially proportional to the duration of use of the power generator 300 such as the integrated value of the numbers of rotations of the internal combustion engine 210 and the running distance of the automatic drive vehicle 200 is reset.

After step S24, when the automatic driving switch 290 is turned on, the switching to the first state takes place. Alternatively, in step S24, the switching to the first state may take place immediately. The same thing can be said to steps S28 and S32 described later.

In step S23, when the signal for canceling the restriction of automatic driving has not been transmitted from the external device 400 to the communication unit 160, the series of steps illustrated in FIG. 4 are terminated without performing any processing. The automatic drive vehicle 200 is continuously kept in the second state.

As described above, in the present embodiment, the determination result that there is a high possibility of the power generator 300 entering the underpower generation state is changed and the restriction of automatic driving based on the change of the determination result is canceled based on a signal transmitted from the external device 400. This is because, since there is a high possibility of the power generator 300 entering the underpower generation state but the power generator 300 is normally operating now, it is difficult for the control device 100 to determine by itself that the possibility of entering the underpower generation state has become low due to the replacement of power generators later.

However, providing a mechanism to detect a specific ID of the power generator 300, for example, allows the control device 100 to determine by itself that the state in which "there is a high possibility of the power generator 300 entering the underpower generation state" has been eliminated due to the replacement of the power generator 300. For example, providing a reader to read a two-dimensional barcode on the power generator 300 allows the control device 100 to detect that the power generator 300 has been replaced with a new one based on the information from the two-dimensional barcode and cancel the restriction of automatic driving according to the detection. In addition, the control device 100 may determine whether the newly installed power generator 300 is a normal one and cancel the restriction of automatic driving only when the power generator 300 is a normal one.

When it is not determined in step S22 that it was determined that there was a high possibility of the power generator 300 entering the underpower generation state, the process proceeds to step S25. In step S25, it is determined whether it was determined in step S02 illustrated in FIG. 2 that the power generator 300 was in the underpower generation state. When it was determined that the power generator 300 was in the underpower generation state, the process proceeds to step S26.

In step S26, similarly to step S01 illustrated in FIG. 3, the information acquisition unit 110 acquires the power generator information. In step S27 after step S26, similarly to step S02 illustrated in FIG. 3, it is determined whether there has occurred an abnormality in the power generator 300. When it is determined that the power generator 300 is normal, the process proceeds to step S28. In step S28, similarly to step S24, a process of canceling the restriction of automatic driving is performed.

When it is not determined in step S27 that the power generator 300 is normal, the series of steps illustrated in FIG. 4 are terminated. Accordingly, the automatic drive vehicle 200 is continuously kept in the second state.

When it was determined that the power generator 300 was not in the underpower generation state in step S25, the process proceeds to step S29. In step S29, similarly to step S01 illustrated in FIG. 3, the information acquisition unit 110 acquires the power generator information. In step S30 After step S29, similarly to step S02 illustrated in FIG. 3, it is determined whether there has occurred an abnormality in the power generator 300. When it is determined that the power generator 300 is normal, the process proceeds to step S31.

Proceeding to step S31 means that the overpower generation in the power generator 300 has been eliminated. In step S31, a process of switching the shutoff device 230 brought into the open state in step S09 illustrated in FIG. 3 to the closed state. In step S32 After step S31, similarly to step S24, a process of canceling the restriction of automatic driving is performed. When it is determined in step S30 that there has occurred an abnormality in the power generator 300, the series of steps illustrated in FIG. 4 are terminated without performing any processing.

As described above, in the control device 100 according to the present embodiment, after the switching to the second state, when the information acquisition unit 110 acquires the power generator information indicating that the power generator is normal (an affirmative determination is made in step S27 or step S30), the restriction of automatic driving is canceled and the operation control unit 130 performs the switching to the first state.

Similarly, after the switching to the second state, when the external device 400 supplies a signal indicating that the power generator 300 is normal (a negative determination is made in step S23), the restriction of automatic driving is canceled and the operation control unit 130 performs the switching to the first state. According to this configuration, it is possible to cancel the restriction of automatic driving at an appropriate timing.

In the example illustrated in FIG. 4, the restriction is canceled based on the signal from the external device 400 only when it was determined in step S02 illustrated in FIG. 2 that "there is a high possibility of entering the underpower generation state". In another mode, a process as in a modification example illustrated in FIG. 5 may be performed.

Figure 5:
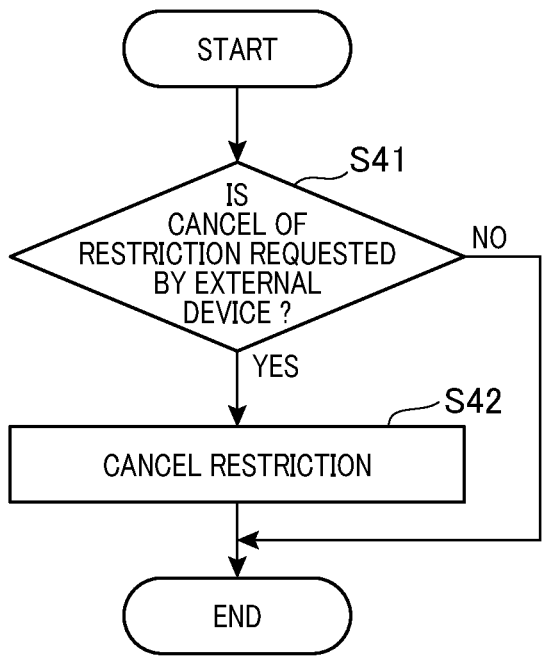
FIG. 5 is a modification example of the flowchart illustrated in FIG. 4.

In the first step S41 of the process illustrated in FIG. 5, similarly to step S23 illustrated in FIG. 4, it is determined whether a signal for canceling the restriction of automatic driving has been transmitted from the external device 400 to the communication unit 160. When it is not determined that a signal for canceling the restriction of automatic driving has been transmitted from the external device 400 to the communication unit 160, the series of steps illustrated in FIG. 5 are terminated without performing any processing. The automatic drive vehicle 200 is continuously kept in the second state.

When it is determined in step S41 that a signal for canceling the restriction of automatic driving has been transmitted from the external device 400 to the communication unit 160, the process proceeds to step S42. In step S42, similarly to step S24 illustrated in FIG. 4, a process of canceling the restriction of automatic driving is performed. At this time, when the shutoff device 230 is in the open state, the shutoff control unit 140 performs a control of switching the shutoff device 230 to the closed state in step S42.

In the modification example illustrated in FIG. 5, whatever abnormality has occurred in the power generator 300, the restriction is canceled based on the signal from the external device 400. That is, the control device 100 does not determine whether the power generator 300 has become normal but cancels the restriction only based on the signal from the external device 400. Even in this mode, the same advantageous effects as described above with reference to FIG. 4 can be produced.

Figure 6:
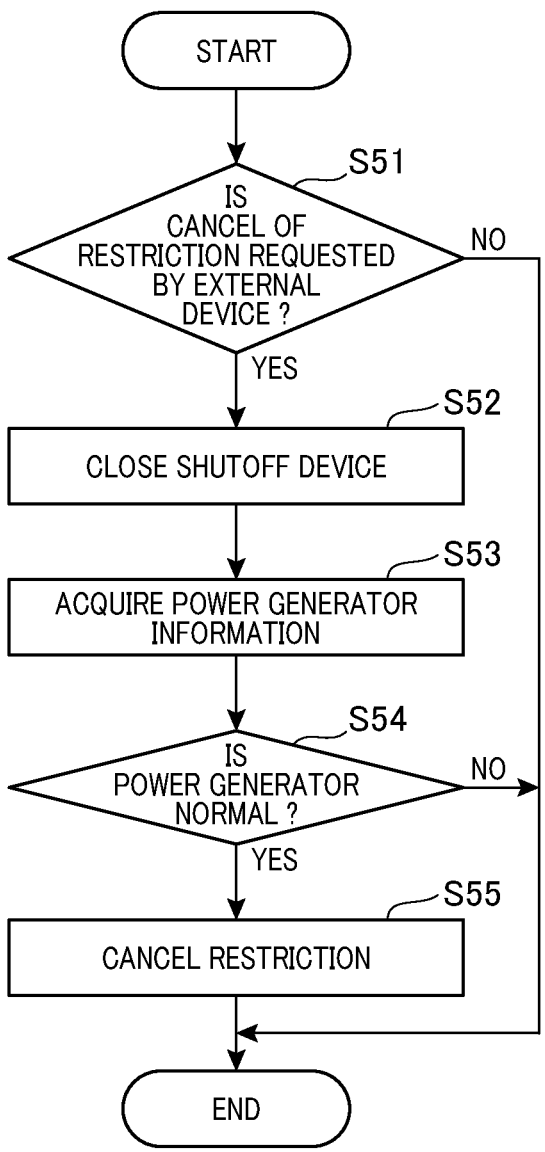
FIG. 6 is another modification example of the flowchart illustrated in FIG. 4.

Another modification example illustrated in FIG. 4 will be described with reference to FIG. 6. The series of steps illustrated in FIG. 6 are executed instead of step S29 and the subsequent steps illustrated in FIG. 4 when a negative determination is made in step S25 illustrated in FIG. 4.

In first step S51, similarly to step S23 illustrated in FIG. 4, it is determined whether a signal for canceling the restriction of automatic driving has been transmitted from the external device 400 to the communication unit 160. When it is not determined that a signal for canceling the restriction of automatic driving has been transmitted from the external device 400 to the communication unit 160, the series of steps illustrated in FIG. 6 are terminated without performing any processing. The automatic drive vehicle 200 is continuously kept in the second state.

When it is determined in step S51 that a signal for canceling the restriction of automatic driving has been transmitted from the external device 400 to the communication unit 160, the process proceeds to step S52. In step S52, the shutoff control unit 140 performs a control of switching the shutoff device 230 to the closed state. In step S53 After step S52, similarly to step S01 illustrated in FIG. 3, the information acquisition unit 110 acquires the power generator information. In step S54 After step S53, similarly to step S02 illustrated in FIG. 3, it is determined whether there has occurred an abnormality in the power generator 300. When it is determined that the power generator 300 is normal, the process proceeds to step S55.

Proceeding to step S55 means that the overpower generation in the power generator 300 has been eliminated. In step S55, similarly to step S24 illustrated in FIG. 4, a process of canceling the restriction of automatic driving is performed. When it is determined in step S54 that there has occurred an abnormality in the power generator 300, the series of steps illustrated in FIG. 6 are terminated without performing any processing.

As described above, in the modification example illustrated in FIG. 6, the external device 400 performs a process of switching the shutoff device 230 to the closed state but does not perform a process of canceling the restriction of automatic driving. The latter process is performed by the control device 100. Even in this mode, the same advantageous effects as described above with reference to FIG. 4 can be produced.

A second embodiment will be described with reference to FIG. 7. Hereinafter, differences from the first embodiment will be mainly described and descriptions of the points in common with the first embodiment will be omitted as appropriate.

Figure 7:
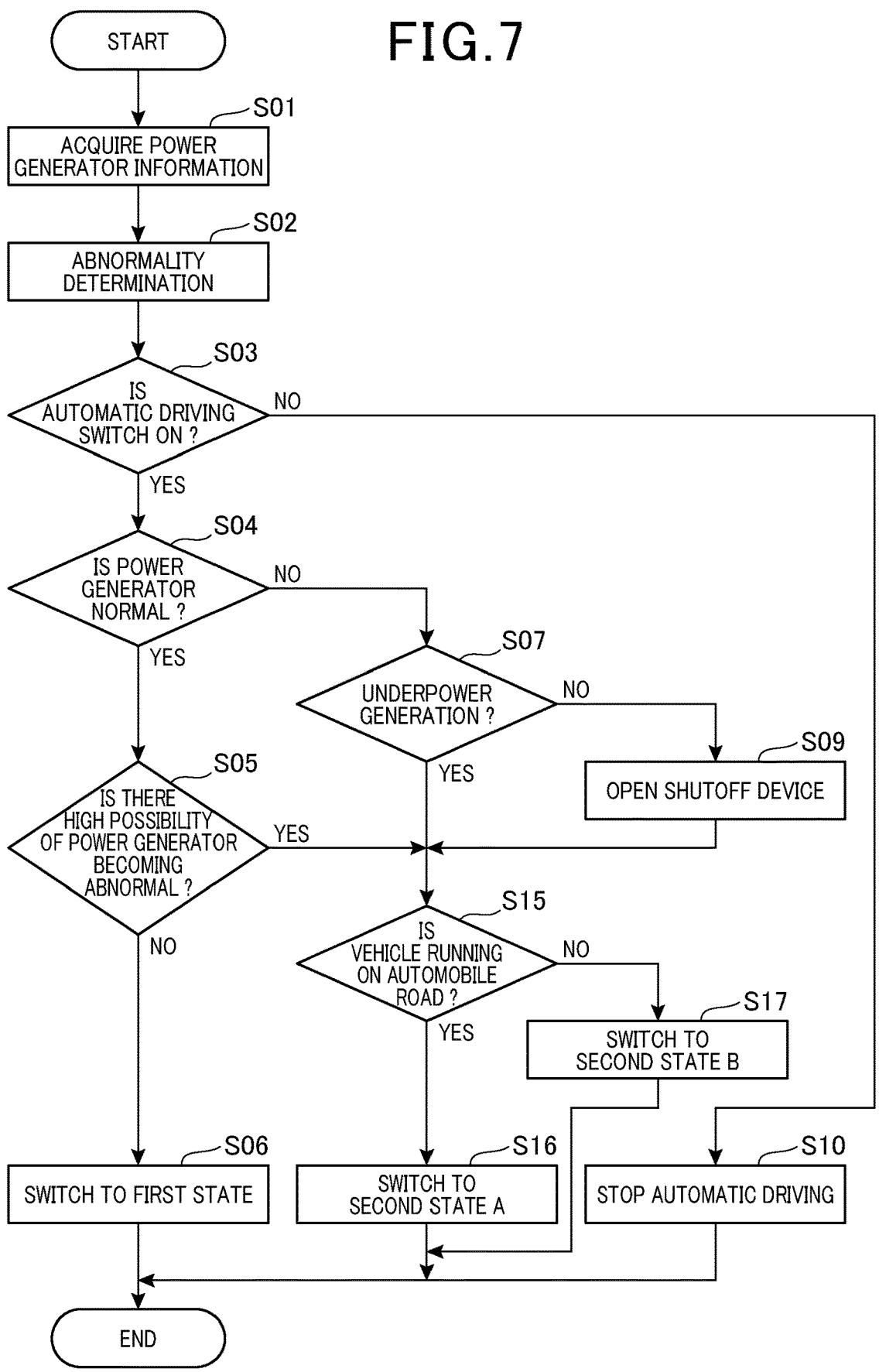
FIG. 7 is a flowchart of a process performed by a control device according to a second embodiment.

The series of steps illustrated in FIG. 7 are executed instead of the series of steps illustrated in FIG. 3. In the series of steps illustrated in FIG. 7, step S08 in the series of steps illustrated in FIG. 3 is replaced by steps S15, S16, and S17. Among the steps illustrated in FIG. 7, the same steps as those illustrated in FIG. 3 are given the same reference numerals (such as "S01") as illustrated in FIG. 3.

When an affirmative determination is made in step S05, or when an affirmative determination is made in step S07, or after step S09 is performed, the process proceeds to step S15. That is, when there arises the need to switch to the second state, the process proceeds to step S15.

In step S15, it is determined whether an automatic drive vehicle 200 is running on a motorway and whether the automatic drive vehicle 200 is going to run a motorway. This determination is made based on a signal from a navigation system 280.

When the automatic drive vehicle 200 is not running on a motorway or is not going to run on a motorway, the process proceeds to step S17. In step S17, similarly to step S08 illustrated in S17, a determination unit 170 decides to switch to a second state. According to the determination, an operation control unit 130 performs switching to the second state.

When it is determined in step S15 that the automatic drive vehicle 200 is running on a motorway or is going to run on a motorway, the process proceeds to step S16. In step S16, the determination unit 170 decides to switch to a second state. The operation control unit 130 performs switching to the second state. The second state switched in step S16 is different from the second state switched in step S17. Therefore, the second state in step S16 will be described as "second state A" and the second state in step S17 will be described as "second state B".

When the process proceeds to step S16 (switches to the second state A), automatic driving is restricted greatly as compared to the case where the process proceeds to step S17 (switches to the second state B). For example, only automatic steering is restricted in the second state B in step S17, whereas both automatic steering and automatic driving are restricted in the second state A in step S16.

When the power generator 300 becomes defective while the automatic drive vehicle 200 is running on a motorway, it is difficult to evacuate automatically and safely the automatic drive vehicle 200 only by power supply from the battery 240. On the other hand, when the automatic drive vehicle 200 is running on a general road, even when the power generator 300 becomes defective, there is a high possibility that the automatic drive vehicle 200 can be evacuated automatically and safely by power supply from the battery 240. Accordingly, in the present embodiment, when the automatic drive vehicle 200 is running on a motorway, the automatic driving in the second state is greatly restricted as compared to the case where the automatic drive vehicle 200 is not running on a motorway. Accordingly, it is possible to prevent a situation in which the power generator 300 becomes defective during running on a motorway and power supply is lost during automatic driving.

In an aspect, when it is determined in step S15 that the automatic drive vehicle 200 is going to run on a motorway, in addition to the switching to the second state, the guided route may be changed so that the automatic drive vehicle 200 will not run on a motorway.

A third embodiment will be described with reference to FIG. 8. Hereinafter, differences from the first embodiment will be mainly described, and descriptions of points in common with the first embodiment will be omitted as appropriate.

The series of steps illustrated in FIG. 8 are repeatedly executed by a control device 100 after each lapse of a predetermined period in the state in which an internal combustion engine 210 is automatically stopped by an internal combustion engine control unit 120, that is, in an idle stop state. In the present embodiment, the series of steps illustrated in FIG. 8 are executed in parallel to the other steps illustrated in FIGS. 3 and 4.

In first step S61, the internal combustion engine control unit 120 determines whether a first request from a vehicle ECU 201 has been received by a communication unit 160. As described above, the first request is a control signal transmitted from the vehicle ECU 201 to the control device 100 to start the internal combustion engine 210 when the driving force for running an automatic drive vehicle 200 becomes necessary.

When the first request has been received, the process proceeds to step S62. In step S62, the internal combustion engine control unit 120 executes a process of starting the internal combustion engine 210 to return from the idle stop state. After that, the control device 100 terminates the series of steps illustrated in FIG. 8.

When it is not determined in step S61 that the first request has been received, the process proceeds to step S63. In step S63, it is determined whether a second request from the vehicle ECU 201 has been received by the communication unit 160. As described above, the second request is a control signal transmitted from the vehicle ECU 201 to the control device 100 to start the internal combustion engine 210 when power generation by a power generator 300 becomes necessary.

When the second request has not been received, the series of steps illustrated in FIG. 8 is terminated without starting the internal combustion engine 210. When the second request has been received, the process proceeds to step S64. In step S64, similarly to step S01 illustrated in FIG. 3, the information acquisition unit 110 acquires the power generator information. In step S65 After step S64, similarly to step S02 illustrated in FIG. 3, it is determined whether an abnormality has occurred in the power generator 300. When it is determined that the power generator 300 is normal, the process proceeds to step S62. After that, a process of starting the internal combustion engine 210 is performed to return from the idle stop state.

When it is determined in step S65 that an abnormality has occurred in the power generator 300, the control device 100 terminates the series of steps illustrated in FIG. 8 without starting the internal combustion engine 210. As described above, in the present embodiment, when the power generator information acquired by the information acquisition unit 110 indicates that power generation is not been performed normally by the power generator 300, the internal combustion engine control unit 120 does not return from the idle stop state even in the event of receipt of the second request. In addition, the vehicle ECU 201 may be configured not to output the second request when recognizing that the power generator 300 is in a failed state.

Accordingly, it is possible to avoid a situation in which the internal combustion engine 210 is unnecessarily started when the power generation is not being performed normally by the power generator 300. When the generation of driving force is intended, that is, when the first request has been received, the internal combustion engine 210 is started.

The embodiments have been described so far with reference to specific examples. However, the present disclosure is not limited to these specific examples. These specific examples to which design changes are added as appropriate are also in the scope of the present disclosure as far as they include features of the present disclosure. The elements included in the specific examples, the arrangements, conditions, and shapes of the elements described above are not limited to the exemplified ones but can be changed as appropriate. The elements included in the specific examples described above can be changed in combination as appropriate as far as the change causes no technical contradictions.

What is claimed is:

1. A method of controlling an automatic drive vehicle that includes:
   at least one computer system that is configured to control certain operational activities of the automatic drive vehicle;
   a battery that supplies power to operate the at least one computer system; and
   a temperature sensor configured to measure a temperature of the battery,
   the method comprising the steps of:
   the at least one computer system acquiring the temperature of the battery measured by the temperature sensor; and
   the at least one computer system determining whether (i) all of the certain operational activities are conducted in an automatic driving mode in a first control state or (ii) one or more of the certain operational activities are conducted in the automatic driving state without restriction while at least another of the certain operational activities is conducted with restriction in the automatic driving mode or is not conducted in the automatic driving mode in a second control state based on the temperature of the battery.

2. The method of controlling the automatic drive vehicle according to claim 1, wherein
the at least one computer system, in the second control state, prevents the loss of power during the automatic driving mode such that the automatic drive vehicle is automatically and safely operated by the power from the battery.

3. The method of controlling the automatic drive vehicle according to claim 2, wherein
the certain operational activities include a running speed of the automatic drive vehicle.

4. The method of controlling the automatic drive vehicle according to claim 3, wherein
an inter-terminal voltage of the battery is obtained by the at least one computer system, and
the at least one computer system determines, in the second control state, which of the certain operational activities should be restricted
when the inter-terminal voltage becomes lower than a predetermined value.

5. The method of controlling the automatic drive vehicle according to claim 1, wherein
the at least one computer system switches from the first control state to the second control state when the temperature of the battery exceeds a predetermined value.

6. The method of controlling the automatic drive vehicle according to claim 5, wherein
when the battery is replaced, a part of information stored in a storage unit of the automatic drive vehicle is rewritten.

7. An automatic drive vehicle comprising:
at least one computer system that is configured to control certain operational activities of the automatic drive vehicle;
a battery configured to supply power to operate the at least one computer system; and
a temperature sensor configured to measure a temperature of the battery,
wherein the at least one computer system is configured to:
acquire the temperature of the battery measured by the temperature sensor; and
determine whether (i) all of the certain operational activities are conducted in an automatic driving mode in a first control state or (ii) one or more of the certain operational activities are conducted in the automatic driving mode without restriction while at least another of the certain operational activities is conducted with restriction in the automatic driving mode or is not conducted in the automatic driving mode in a second control state
based on the temperature of the battery.

8. The automatic drive vehicle according to claim 7, wherein the at least one computer system is configured to, in the second control state, prevent the loss of power during the automatic driving mode such that the automatic drive vehicle is safely operated by the power from the battery.

9. The automatic drive vehicle according to claim 8, wherein the certain operational activities include a running speed of the automatic drive vehicle.

10. The automatic drive vehicle according to claim 9, wherein
the at least one computer system is configured to:
obtain an inter-terminal voltage of the battery;
determine, in the second control state, which of the certain operational activities should be restricted when the inter-terminal voltage becomes lower than a predetermined value.

11. The automatic drive vehicle according to claim 9, wherein the at least one computer system switches from the first control state to the second control state when the temperature of the battery exceeds a predetermined value.

12. The automatic drive vehicle according to claim 11, wherein the automatic drive vehicle is configured such that when the battery is replaced, a part of information stored in a storage unit of the automatic drive vehicle is rewritten.

13. The method of controlling the automatic drive vehicle of claim 1, wherein the certain operational activities include vehicle steering, vehicle braking and vehicle driving force.

14. The method of controlling the automatic drive vehicle of claim 1, wherein the certain operational activities consist of vehicle steering, vehicle braking and vehicle driving force.

15. The automatic drive vehicle according to claim 7, wherein the certain operational activities include vehicle steering, vehicle braking and vehicle driving force.

16. The automatic drive vehicle of claim 7, wherein the certain operational activities consist of vehicle steering, vehicle braking and vehicle driving force.

* * * * *